United States Patent
Riley et al.

(10) Patent No.: US 9,933,521 B2
(45) Date of Patent: Apr. 3, 2018

(54) AERIAL POSITIONING SYSTEMS AND METHODS

(71) Applicant: THE BOEING COMPANY, Chicago, IL (US)

(72) Inventors: David Ray Riley, Chesterfield, MO (US); John N. Sanders-Reed, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 519 days.

(21) Appl. No.: 14/543,493

(22) Filed: Nov. 17, 2014

(65) Prior Publication Data

US 2015/0293225 A1   Oct. 15, 2015

Related U.S. Application Data

(60) Provisional application No. 61/979,404, filed on Apr. 14, 2014.

(51) Int. Cl.
| | |
|---|---|
| *G01S 17/06* | (2006.01) |
| *G01S 17/93* | (2006.01) |
| *B64D 39/00* | (2006.01) |
| *G01S 17/42* | (2006.01) |
| *G01S 17/74* | (2006.01) |

(Continued)

(52) U.S. Cl.
CPC .............. *G01S 17/06* (2013.01); *B64D 39/00* (2013.01); *G01S 17/42* (2013.01); *G01S 17/74* (2013.01); *G01S 17/88* (2013.01); *G01S 17/933* (2013.01); *G05D 1/0684* (2013.01); *G05D 1/104* (2013.01); *G08G 5/0021* (2013.01); *G08G 5/0069* (2013.01); *G08G 5/0095* (2013.01); *G08G 5/025* (2013.01)

(58) Field of Classification Search
CPC .......... G01C 3/00; G01B 11/26; B64D 39/00; G01S 17/00; G01S 17/06; G01L 3011/26; B64C 39/00
See application file for complete search history.

(56) References Cited

U.S. PATENT DOCUMENTS 4,025,193 A * 5/1977 Pond ................. G01S 17/06
                                                244/135 A
6,669,145 B1   12/2003 Green
(Continued)

FOREIGN PATENT DOCUMENTS

| JP | H05 170191 | 7/1993 |
| WO | WO 01/02875 | 1/2001 |

OTHER PUBLICATIONS

Extended European search report for Application No. 15155960.6-1812, dated Oct. 9, 2015.
(Continued)

*Primary Examiner* — Luke D Ratcliffe
(74) *Attorney, Agent, or Firm* — Jay J. Hoette; The Small Patent Law Group, LLC (57) ABSTRACT

Aerial positioning systems and methods include a Light Detection and Ranging (LIDAR) device mounted to a hub and one or more reflectors attached to a portion of an aircraft and configured to encode information scanable by the LIDAR device. The LIDAR device is configured to scan a field of view to identify the one or more reflectors and reflector encoded information to determine reflector position data.

37 Claims, 7 Drawing Sheets

(51) Int. Cl.
    *G01S 17/88*     (2006.01)
    *G08G 5/00*     (2006.01)
    *G08G 5/02*     (2006.01)
    *G05D 1/06*     (2006.01)
    *G05D 1/10*     (2006.01)

(56) References Cited

U.S. PATENT DOCUMENTS

| | | | | |
|---|---|---|---|---|
| 2012/0261516 | A1* | 10/2012 | Gilliland | G01S 17/107 244/183 |
| 2015/0162981 | A1* | 6/2015 | Hazelden | G01C 13/008 250/208.2 |

OTHER PUBLICATIONS

Chen, et a,: "Drogue tracking using 3D flash lidar for automomous aerial refueling," Laser Radar Technology and Applications XVI, SPIE, vol. 8037, No. 1, May 13, 2011.

* cited by examiner

AERIAL POSITIONING SYSTEMS AND METHODS

BACKGROUND

The present disclosure relates generally to systems and methods for aerial positioning systems, such as of an unmanned aerial vehicle (UAV).

Aerial positioning systems are used for determining a position of an aircraft in three dimensional space, and may be used to determine a position of an aircraft relative to a hub, such as another structure or vehicle. For example, refueling systems use position information to allow for alignment of a tanker aircraft and the aircraft to be refueled. For example, relative position information may be determined to allow for boom/receptacle or probe/drogue aerial refueling. In other examples, landing systems may use position information to assist landing of an aircraft, such as on a ship or on land. Conventional aerial positioning systems provide position information using global positioning systems (GPS), cameras, radio ranging, or other methods to meet required navigation performance (RNP) requirements, that include accuracy, integrity, continuity, and availability. The inter-related requirements must be met simultaneously for RNP to be met by the positioning system. However, these systems require expensive position determination devices and high-speed data links to allow for the relative position information to be calculated and communicated during aerial refueling or other positioning activities such as landing. Additionally, while these systems may meet accuracy requirements for RNP, these systems may only meet the RNP integrity, continuity and availability requirements in limited situations (e.g. low latitudes for GPS-based systems).

SUMMARY

In accordance with one embodiment, a laser positioning system is provided that includes a Light Detection and Ranging (LIDAR) device and one or more reflectors attached to a portion of an aircraft and configured to encode information scanable by the LIDAR device. The LIDAR device is configured to scan a field of view to identify the one or more reflectors and determine position data based on the encoded information.

In accordance with another embodiment, a laser positioning system is provided that includes a LIDAR device with an adjustable field of view. The LIDAR device is mounted to a hub and is used to determine position information about an aircraft approaching the hub. A receiver reflector is detected by the LIDAR device. A delivery reflector is detected by the LIDAR device. The receiver and delivery reflectors are differenced to provide relative position data.

In accordance with another embodiment, a method for laser positioning is provided. The method includes scanning a field of view using a LIDAR device and determining position data for an aircraft within the field of view based on encoded information from one or more reflectors attached to the aircraft.

The features and functions discussed herein can be achieved independently in various embodiments or may be combined in yet other embodiments, further details of which can be seen with reference to the following description and drawings.

DETAILED DESCRIPTION

The following detailed description of certain embodiments will be better understood when read in conjunction with the appended drawings. It should be understood that the various embodiments are not limited to the arrangements and instrumentality shown in the drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules, systems, or units shown in the attached figures may represent the hardware that operates based on software or hard-wired instructions, the software that directs hardware to perform the operations, or a combination thereof.

Described herein are positioning methods and systems for determining positions of a movable object, such as an aircraft, relative to a target or destination hub, which may also be moving. The positioning methods and systems may be used in various applications or environments, such as for aerial refueling of aircraft, such as for UAVs. However, it should be appreciated that the methods and systems described herein may be implemented on different aerial vehicles, such as different manned aircraft, as well as in non-refueling applications. For example, one or more positioning methods and systems may be implemented in connection with landing an aircraft on a ship or other moving landing location or with landing on land.

In various embodiments, a laser positioning system (LPS) is provided on the hub (e.g., the tanker aircraft, the landing ship, and the like) and is used to determine the relative position between the hub, which defines a target or a destination for the object. For example, the LPS provides a receiver with high-quality position information relative to a tanker aircraft (e.g., aircraft carrying fuel for refueling) to facilitate boom/receptacle or probe/drogue aerial refueling (AR). For example, some embodiments include a laser sensing device, such as a Light Detection and Ranging (LIDAR) device mounted to the hub, such as the tanker aircraft, with one or more retro-reflectors mounted to the object, such as the aircraft to be refueled. For example, one or more coded retro-reflectors may be mounted on the boom, probe, receptacle, or drogue depending on the type of AR being performed. In one embodiment, the LIDAR device is mounted to a tanker aircraft facing aft to scan an area behind the tanker aircraft to identify the one or more coded retro-reflectors. For example, multiple coded retro-reflectors mounted on the boom or drogue may be detected during a scan and the LIDAR device uses scanned characteristics (e.g., measured distances between the retro-reflectors) to ensure that the LPS position information meets RNP accuracy, integrity, continuity, and availability requirements.

In various embodiments, the LPS provides receiver position information, determined from the retro-reflectors, and the distance between the retro-reflectors for integrity monitoring that meets the RNP requirements. For boom/receptacle AR, the LPS provides receiver position information relative to the tanker aircraft. For probe/drogue AR, the LPS provides receiver and drogue relative position information. For example, the use of coded retro-reflectors in various embodiments ensures that the LIDAR is measuring the desired positions with no ambiguity. Thus, position information that meets or exceeds the RNP requirements is provided without the use of a camera array that may be impractical to implement on an aircraft and/or unreliable, expensive radars, or high-speed data links. Thus, LIDAR devices provide position information in various applications, such as for use at altitude in an AR environment. For example, various embodiments may be used for refueling in an Unmanned Carrier-Launch Surveillance and Strike (UCLASS) aircraft.

In various embodiments, a LPS is provided on the landing ship (e.g., the hub) and is used to determine the relative position between the landing ship and the aircraft executing a landing on the landing ship. For example, the LPS provides the aircraft with high-quality position information relative to the landing ship to facilitate landing on a deck of the ship. For example, some embodiments include a laser sensing device, such as a LIDAR device mounted to a portion of the ship, with one or more retro-reflectors mounted to the aircraft and/or other portions of the ship. For example, one or more coded retro-reflectors may be mounted on the landing gear, belly, wings, tail, or other portions of the aircraft. In one embodiment, the LIDAR device is mounted to the ship facing aft to scan an area behind the ship to identify the one or more coded retro-reflectors on the approaching aircraft.

It should be noted that although various embodiments are described in connection with retro-reflectors, different devices or receivers may be used. For example, different types of simple reflectors, laser scanning detectors, or barcodes may be used. In various embodiments, any type of device capable of encoding information for laser scanning detection may be used. Additionally, different types of information may be encoded in addition to or instead of location information. For example, aircraft identifying information, such as a tail number of the aircraft may be encoded.

Figure 1:
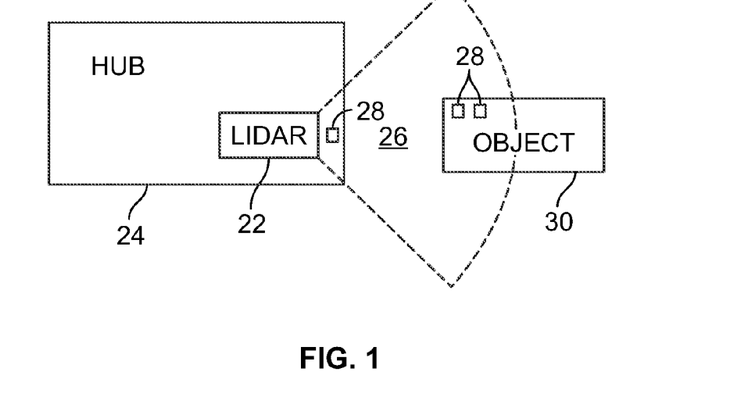
FIG. 1 is a block illustration of laser positioning system in accordance with an embodiment.

With reference now to FIG. 1, an LPS 20 is shown that may be used for aerial refueling. The LPS 20 generally includes a position determining device, illustrated as a LIDAR device 22, attached to a hub 24, which defines a target or destination for an approaching object. The LIDAR device 22 is used to scan for one or more reflectors 28 attached to an object 30, such as an aircraft. In the illustrated embodiment, the hub 24 is illustrated as a fueling aircraft, which may be referred to hereinafter in various embodiments as a tanker aircraft 24, or simply a tanker 24. The LIDAR device 22 may be attached to different portions of the tanker 24, such as positioned or located on different regions of the tanker 24, which may be based on, for example, the type of AR to be performed. For example, the LIDAR device 22 may be attached to a wing of the tanker 24 or a rear portion of the tanker 24. In alternative embodiments, the LIDAR device 22 may be attached to the aircraft 30 and used to scan for reflectors on the tanker 24. In such embodiments, modifications to the tanker 24 may be minimal (e.g., the LIDAR device 22 does not need to be retro-fit or otherwise designed into the tanker 24), such as needing only to apply reflectors 28 to the tanker 24. In such embodiments, the LIDAR device 22 may be looking forward of the aircraft 30 for the tanker 24, for a landing area or for another object.

The LIDAR device 22 may be orientated to scan a defined field of view (FOV) 26, which in various embodiments is located aft of the tanker 24. The field of view 26 may be a predetermined angular scanning range and distance range, for example, from the aft of the tanker 24. The parameters for the field of view 26 may be defined to allow for detection of one or more different types of aircraft or refueling components (e.g., a receptacle or probe) that will engage with a portion of or component of the tanker 24. For example, in the illustrated embodiment, the field of view 26 is defined to scan for one or more reflectors 28 attached to an object 30. The hub 24 defines a target or destination for the object 30 as the object 30 is approaching and attempting to rendezvous with the hub 24. In an exemplary embodiment, the hub 24 is moving itself and the object 30 is attempting to rendezvous with such moving hub 24. The approaching object 30 is illustrated as, and may be referred to hereinafter as, an aircraft 30. In the illustrated embodiment, the aircraft 30 includes a receiver to be refueled by the tanker 24 during AR. It should be noted that in various embodiments the receiver's probe engages with the tanker's extended drogue, but in other embodiments, the tanker's extendable boom engages with the receiver's receptacle.

In one embodiment, the aircraft 30 is a UAV having one or more reflectors 28 attached to the receptacle or probe of the aircraft 30 depending on whether boom/receptacle or probe/drogue AR is to be performed. It should be noted that in the various embodiments, a receiver reflector or retro-reflector generally refers to reflector or retro-reflector attached to the receiver, such as the aircraft 30, and a delivery reflector or retro-reflector refers to a reflector or retro-reflector attached to the tanker 24 or a portion of the system providing refueling (e.g., boom or drogue). The one or more reflectors 28 may be any type of reflector, such as a retro-reflector that encodes information for use in position determination of the aircraft 30 relative to the tanker 24 that may be used in the AR operation. The arrangement and/or configuration of the one or more reflectors 28 may be varied as desired or needed to provide encoded information (e.g., a pattern or array of reflectors 28 that are optionally located at different lateral positions, different elevation positions, such as at different heights or on a raised surface, and the like). In some embodiments, location information (or other information as described herein) may be encoded and determined using reflection only information from the one or more reflectors 28 (e.g., based on the lateral spacing or positioning of the reflectors 28 along the surface to which the reflectors 28 are mounted), elevation only information from the one or more reflectors 28 (e.g., based on the various reflectors 28 being positioned at different heights, such as measured from the surface to which the reflectors 28 are mounted), or reflection and elevation information from the one or more reflectors 28. In various embodiments, for example, the one or more reflectors 28 are retro-reflectors tuned to the wavelength of the laser of, or otherwise visible by, the LIDAR device 22. Optionally, the location information may be encoded by using multiple reflectors 28 positioned at various positions relative to each other. The LIDAR device 22 detects the encoded information by determining a distance between the multiple reflectors 28.

Thus, by scanning with the LIDAR device 22, encoded information from the one or more reflectors 28 may be determined and used to facilitate alignment of a portion of the aircraft 30 with a portion of the tanker 24 during AR operations. For example, in some embodiments, the LIDAR device 22 is configured to perform scanning in an azimuth and elevation direction to identify any reflectors 28 within the field of view 26. For example, in some embodiments, the LIDAR device 22 performs three-dimensional (3D) LIDAR scanning to identify a portion of the aircraft 30 (e.g., a receptacle or probe) and/or to identify a portion of the tanker 24 (e.g., boom or drogue).

In various embodiments, the LPS 20 performs laser positioning that allows for boom/receptacle automated aerial refueling (AAR). In some embodiments, the LIDAR device 22 may be a 3D LIDAR device available as COTS or as near COTS items. The LIDAR device 22 may have adjustable parameters, for example, based on the particular AAR application. For example, the cross range (optical resolution), field of view 26, and frame rate of the LIDAR device 22 are inter-related and may be adjusted. The adjustable parameters may be adjusted based on the proximity of the reflectors 28 to the LIDAR device 22. For example, a larger field of view 26 requires more spots for the same resolution, which increases scan time, and may be used when the reflectors 28 are further from the LIDAR device 22. A reduced field of view 26 allows for increased frame rate, such as when the reflectors 28 are closer to the LIDAR device 22. In some embodiments, the following parameters may be provided:

0.1 mrad optical resolution (10 cm at 1 km);
    1 cm range resolution (range up to 3 km); and/or
    <1 cm x,y,z accuracy at 50 ft.

It should be appreciated that pulse rate for the LIDAR operation is related to peak power (which affects range) and laser total average power available. For example, in some embodiments, the pulse rates may vary from 20-200 KHz at a pulse width of about 1 nanosecond (nsec). It should be noted that the LIDAR device 22 may operate at different frequencies, for example, an eye safe frequency of 1540 nm, which is difficult to detect from the ground or another vehicle.

Additionally, the LIDAR device 22 may be configured to perform different types of scanning operations, such as within the field of view 26. For example, in various embodiments, one or more of a raster or rosette scan pattern, among others, may be used. Using the scanning operation, the LIDAR device 22 is able to intrinsically measure angle and range, and return intensity information. The LIDAR device 22 may be a scanning LIDAR configured to scan, for example, using galvanometers and mirrors. The FOV, frame rate, and/or resolution may be dynamically adjusted. The LIDAR device 22 may be a flash LIDAR configured to scan electronically. Optionally, the LIDAR FOV 26 can be adjusted to encompass a wider area as the receiver approaches the transition point. Once the receiver has been located, the LIDAR FOV 26 can be restricted to the area where the retro-reflectors 28 are located to increase the scan rate. (In other words, after the retro-reflectors 28 have been located and/or the receiver's ID has been confirmed, the LIDAR device 22 can tighten the search (e.g., limit the search area data used) to locate the receiver on each successive scan by utilizing the receiver's last known position (and the retro-reflectors 28 for integrity monitoring) and ignore the rest of the y, z scan region).

Figure 2:
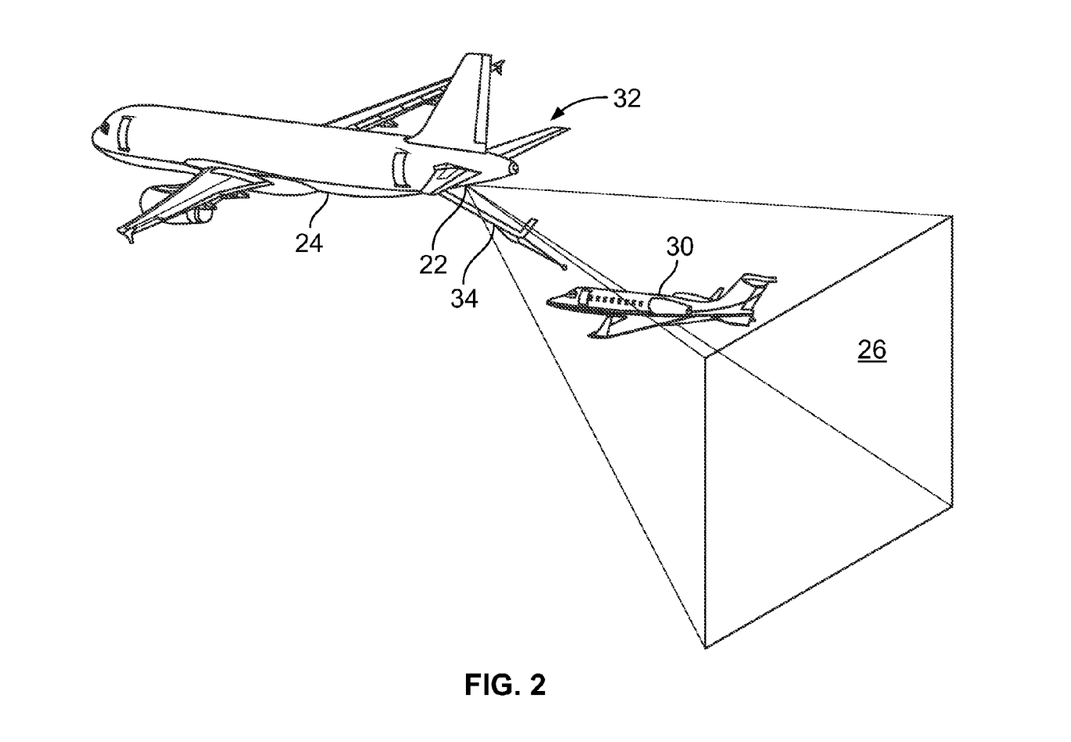
FIG. 2 is an illustration of boom/receptacle aerial refueling in accordance with an embodiment.

For example, FIG. 2 illustrates one embodiment for boom/receptacle AR operation. In this embodiment, the LIDAR device 22 is mounted in the tail 32 of the tanker 24 above the boom 34 that extends aft of the tanker 24. As should be appreciated, the boom 34 may be provided in different configurations and allows for different types of movement relative to the tanker 24 and for engagement with a receptacle of the aircraft 30. As can be seen in FIG. 2, the LIDAR device 22 can scan an area behind and below the tanker 24 shown as the field of view 26. In this embodiment, scanning by the LIDAR device 22 within the field of view 26 encompasses the contact, astern, and transition point. In operation, the accuracy of the LIDAR device 22 increases as the receiver (e.g., formed from the reflectors 28 shown in FIG. 1) approaches the tanker 24, which in some embodiments, provides sub-centimeter accuracy in contact, where the receiver is refueled.

Figure 3:
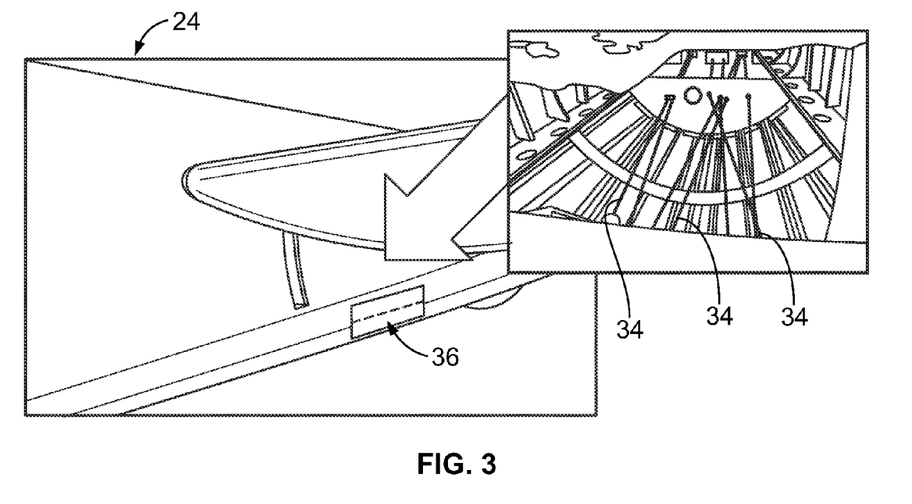
FIG. 3 is an illustration of a portion of an aircraft in which the laser positioning system of FIG. 1 may be implemented.

It should be noted that the LIDAR device 22 may be attached to different portions of the tanker 24. For example, as shown in FIG. 3, wherein the tanker 24 is illustrated as a KC-135 aircraft, the LIDAR device 22 may be an aft facing device mounted in the tail on the left or right side of the boom (illustrated as A and B). For example, the LIDAR device 22 may be located on either side of the control cables 34, inverted, and facing aft. In one embodiment, a door 36, such as a side-hinged, electro-mechanical actuator EMA-actuated door, may be provided on the fuselage of the tanker 24 and opened to allow the LIDAR device 22 mounted therein to perform LIDAR scanning operations as described herein.

Figure 4:
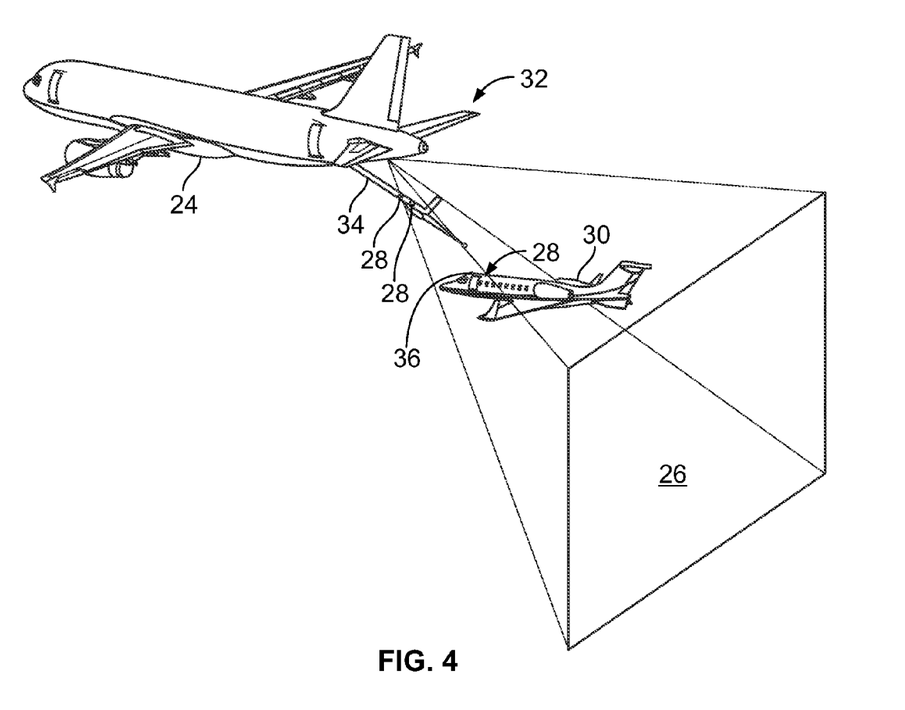
FIG. 4 is another illustration of boom/receptacle aerial refueling in accordance with an embodiment.

As can be seen in FIG. 4, which shows the LIDAR device 22 arrangement of FIG. 2, one or more reflectors 28, which in this embodiment, are retro-reflectors, are attached to a portion of the tanker 24 and a portion of the aircraft 30. In this embodiment, tanker reflectors 28 are attached to the non-retractable portion of the boom 34 of the tanker 24 and receive reflectors 28 are attached to the area around the receptacle 36 of the aircraft 30. The tanker retro-reflectors 28 on the boom 34 are at a predetermined position on the non-retractable portion of the boom 34 and the receiver retro-reflector 28 is at a predetermined position on the receiver. The LPS can measure the distance between the tanker retro-reflectors 28 on the boom 34 and the receiver retro-reflector 28 each pass to ensure RNP requirements are met for that scan. The position of the receiver retro-reflector 28, relative to the tanker, is provided to the receiver via a tanker-receiver datalink and the aircraft 30 flight control computer uses such information to fly to the tanker's 24 contact position and maintain that position for the tanker's boom operator to insert the extendable portion of the boom 34 into the receiver's receptacle 36. For example, the tanker's 24 velocity, Euler angles, accelerations and the like may be transmitted via the datalink. The LPS may transmit the relative distance, elevation, azimuth angle and the like via the datalink. Optionally, one or more retro-reflectors 28 may be positioned on the extendable portion of the boom 34 to determine the relative position between the receptacle 36 and the boom 34.

In one embodiment, the reflectors 28, provided as retro-reflectors on the boom 34 and receiver, which in this embodiment is the aircraft 30, return strong signals, which increases the receiver detection range. In various embodiments, the LIDAR device 22 is configured to only search for, and return reflector x,y,z position and does not generate an image. However, in other embodiments, an image may be generated, for example, to provide additional information, such as to identify the type of aircraft 30 to be refueled, or an image to be displayed to the tanker air vehicle operator (AVO) who is controlling the aircraft 30 remotely.

Figure 5:
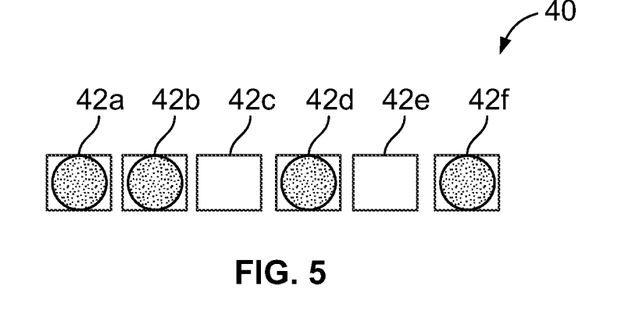
FIG. 5 is an illustration of reflectors for the laser positioning system arranged in accordance with an embodiment.
Figure 6:
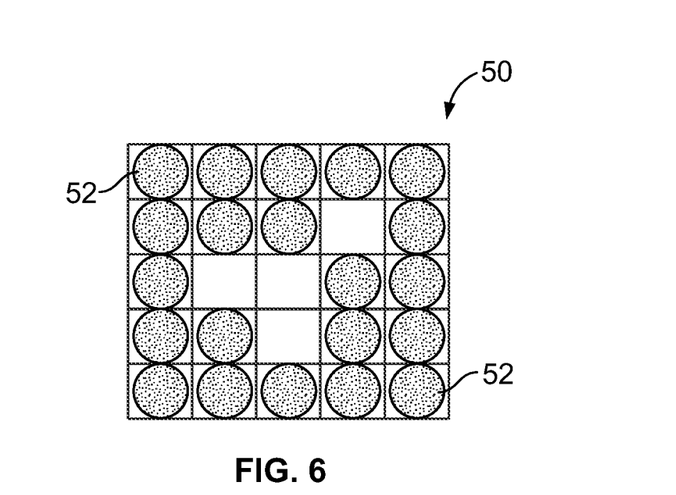
FIG. 6 is an illustration of reflectors for the laser positioning system arranged in accordance with an embodiment.

Different arrangements of reflectors 28 may be provided. For example, FIG. 5 illustrates a one dimensional (1D) array 40 of retro-reflectors 42 and FIG. 6 illustrates a two-dimensional (2D) array 50 of retro-reflectors 52. In operation, the retro-reflectors 42 and 52 provide an increased signal/noise and allow for encoding data. In particular, with respect to increased signal/noise, the retro-reflectors 42 and 52 allow for the receiver to be detected at a greater distance. Additionally, with respect to encoding information, the retro-reflectors 42 and 52 may be arranged or aligned to provide coded data to allow for positive identification of each of the of retro-reflectors 42 and 52 and allow the LIDAR device 22 (shown in FIG. 1) to calculate the distance between the boom 34 retro-reflectors for integrity monitoring.

In some embodiments, the 1D array 40 may be mounted, for example, on the top of the non-retractable portion of the boom 34 and the 2D array 50 may be mounted, for example, on the underside of the air refueling door. It should be noted that although the 2D array 50 is illustrated in a square configuration, different 2D patterns may be provided, such as a rectangle, triangle, or trapezoid, among other shapes.

Any number of retro-reflectors 42 may be provided in the arrays (e.g., the 1D array 40 includes six retro-reflectors 42a-42f). The retro-reflectors 42 may have different characteristics, such as different colors (e.g., light and dark, white and black, and the like) to provide encoding of information. For example, positioning of different color retro-reflectors in the array may produce different patterns for encoding of information. In one embodiment of the 1D array 40, the end or edge of retro-reflectors 42a and 42f are always present. In the illustrated embodiment, other evenly spaced retro-reflectors 42b, 42c, 42d, 42e represent bits (coded data bits). In particular, when any one of the retro-reflectors 42b, 42c, 42d, 42e is present (e.g., mounted to the surface or having a light color), this corresponds to a "1" bit or "on" and when any one of the retro-reflectors 42b, 42c, 42d, 42e is not present (e.g., not mounted to the surface such that the surface is exposed or having a dark color), this corresponds to a "0" bit or "off". Thus, by coupling the retro-reflectors 42 in different arrangements or patterns, different coded information may be communicated, such as to positively identify the retro-reflectors 42 as corresponding to a particular portion of the tanker 24 (e.g., boom 34) or the aircraft 30 (e.g., receptacle 36). The retro-reflectors 52 may be arranged in a pattern to likewise provide coded information. It should be noted that one or more of the retro-reflectors 42 may be configured to provide parity bit information.

In various embodiments, the retro-reflectors 42 or 52 are mounted in a raised configuration with respect to the surface on which the retro-reflectors 42 or 52 are mounted. For example, the retro-reflectors 42 or 52 may have a thickness or may be mounted on a base structure that positions the retro-reflectors 42 or 52 a distance above the surface on which the retro-reflectors 42 or 52 are mounted. Thus, both reflection information and elevation information may be obtained by the LIDAR device 22 with respect to the retro-reflectors 42 and 52. Using different combinations of positioning and elevation (e.g., mounting the retro-reflectors 42 or 52 at one or more different heights or having retro-reflectors 42 or 52 with one or more different thicknesses) information may be encoded for determination by the LIDAR device 22. For example, the retro-reflectors 42 or 52 may be positioned to define binary bit encoded information.

In an exemplary embodiment, once the aircraft 30 is in the contact position at the station keep relative to the tanker 24, the LIDAR device 22 may be used, such as by the boom operator or an automated system, to guide the extendable section of the boom 34 into the receptacle 36. For example, the LPS may be configured (e.g., pre-programmed) with information regarding the geometry of the boom 34, the angle of the boom 34, and the identification of the retro-reflectors 42 or 52 attached to the boom 34 (such as based on the encoded information from the pattern of the retro-reflectors 42 or 52). In one embodiment, having retro-reflectors 42 or 52 on both the extendable and non-extendable portions of the boom 34, the LIDAR device 22 can generate integrity and accuracy estimates in real-time and provide the information to the AAR system and/or the boom operator of the tanker 24, such as by comparing the measured position (x,y,z) of the retro-reflectors 42 or 52 of the boom 34 and the distance between the retro-reflectors 42 or 52. Thus, in various embodiments, the retro-reflectors 42 or 52 on the boom 34 provide high-confidence integrity monitoring. It should be noted that in some embodiments, the retro-reflectors 42 or 52 attached to the boom 34 are identical (e.g., use the same coded data).

In an exemplary embodiment, the LPS 20 uses the one or more reflectors 42, 52 attached to the tanker 24 and the aircraft 30 to encode information scanable by the LIDAR device 22. The LIDAR device 22 scans the field of view 26 to identify the reflectors 42, 52 and determine position data based on the encoded information. Optionally, the reflectors 42, and/or 52 may be provided at various or multiple heights at each reflector location with the height represents a bit or value that can be used for encoding data. For example, using multiple heights allows more than 2 value (0 or 1) bit, for example by using three different heights to represent three different values for each reflector location.

In an exemplary embodiment, several retro-reflectors 42 or 52 (e.g., two retro-reflectors 42 or 52) are positioned on the receiver in "known" positions. The two retro-reflectors 42 or 52 on the receiver allow for integrity monitoring using the receiver, as well as the drogue or boom.

In an exemplary embodiment, a Tanker/Receiver LPI/LPD datalink is used to communicate position information to the operator of the tanker 24, to the operator of the Air Vehicle Operator (AVO), to the tanker crew, such as the boom operator, and the like. The receiver utilizes the laser positioning system x,y,z data, tanker velocity and accelerations, and tanker's Euler angles to safely maneuver and station keep behind the tanker 24.

Using the LIDAR device 22, in various embodiments, accurate position sensing with the retro-reflectors 42 and 52 may be provided. The LIDAR position accuracy improves as the receiver moves closer to the tanker 24 and LIDAR position sensing integrity is confirmed with each scan by measuring and confirming the distance between retro-reflectors 42 or 52. As such, the receiver's retro-reflector signal/noise improves as receiver moves closer to the tanker 24. In various embodiments, for integrity monitoring, the LIDAR device 22 may scan the retro-reflectors 42 or 52 of the receiver followed by the retro-reflectors 42 or 52 of the boom 34 and if the distance between the retro-reflectors 42 or 52 of the boom 34 exceeds a tolerance (e.g., predetermined tolerance), then the data from the retro-reflectors 42 or 52 of the receiver may be flagged as invalid and the LIDAR device 22 performs the next scan (e.g., 20 Hz scan). Also, in various embodiments, after a predetermined number of invalid scans, such as three invalid scans, the LPS 20 is declared as failed.

Figure 7:
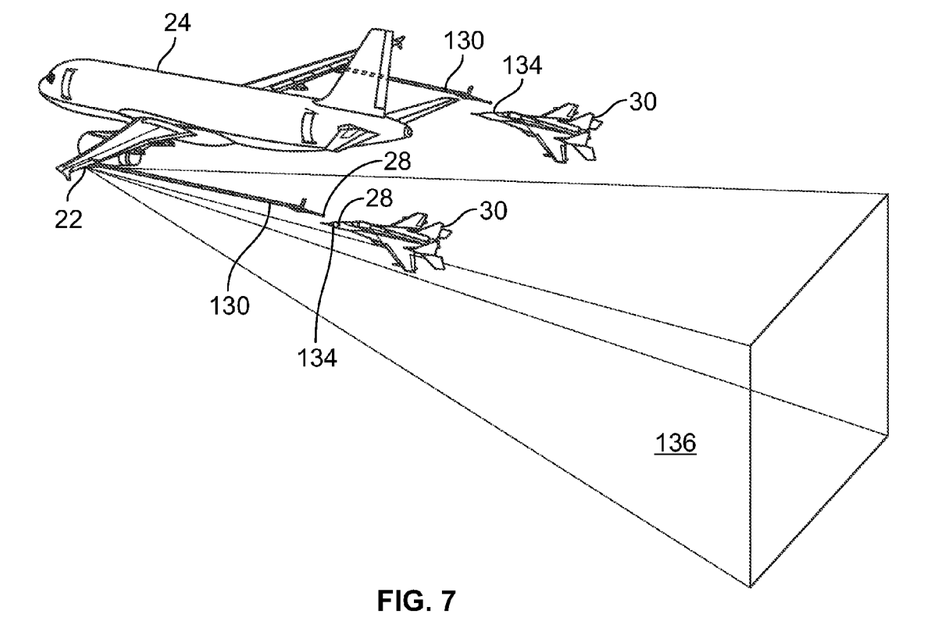
FIG. 7 is an illustration of probe/drogue aerial refueling in accordance with an embodiment.
Figure 8:
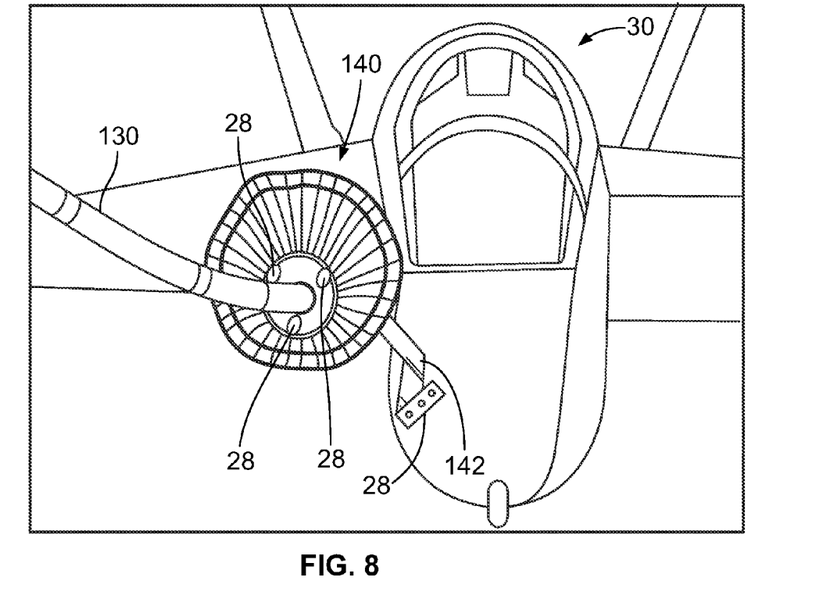
FIG. 8 is an illustration of a drogue with reflectors in accordance with an embodiment.

In an alternative embodiment, the AR operation may be accomplished using the LIDAR device 22 mounted to the aircraft 30 looking forward. Reflectors 28 may be provided on the tanker 24 to determine the relative position of the aircraft 30 with respect to the tanker 24. For example, reflectors 28 may be provided on the body of the tanker 24, such as near the boom 34, on the boom 34 itself, on the wing(s) of the tanker 24, and the like. Optionally, reflectors 28 may be provided on the aircraft 30, such as near the receptacle 36, which may be used by the boom operator during the steering of the boom 34 to the receptacle 36. Providing reflectors 28 on the wing(s) allows the aircraft 30 to match the roll angle, bank angle, speed and the like of the tanker 24 to maintain the contact position and station keep behind the tanker 24. Optionally, the aircraft 30 may include a camera to observe the breakaway lights of the tanker 24 to perform a breakaway operation. Optionally, the aircraft 30 may establish a datalink with the tanker 24 to communication information, such as information relating to the breakaway operation, information relating to the position information determined by the LIDAR device 22, or other information FIGS. 7 and 8 illustrate an exemplary embodiment of the LPS 20 being used for a probe/drogue AR application. The LIDAR device 22 is mounted appropriately within the tanker 24, such as above the hose attachment point (which may be located, for example, on one or both wings of the tanker 24) and can scan the area behind the tanker 24, encompassing contact, astern, awaiting AR, and modified observation and post tanking positions. As can be seen, the hose 130 trails from the tanker 24 for engagement with the probe 134 of the aircraft 30. It should be noted that the LIDAR device 22 may be attached to different portions of the tanker 24. For example, the LIDAR device 22 may be attached to different portions of the wing thereof and facing aft.

The LIDAR device 22 scans an area behind and below the tanker 24, shown as the field of view 136. Thus, in this embodiment, scanning by the LIDAR device 22 within the field of view 136 encompasses the contact, astern, awaiting AR, and modified observation and post tanking positions. In operation, the accuracy of the LIDAR device 22 generally increases as the receiver (e.g., formed form the reflectors 28 shown in FIG. 1) approaches the tanker 24, which in some embodiments, provides sub-centimeter accuracy in contact. It should be noted that in this probe-drogue AR application, the observation and post tanking positions are moved behind the tanker 24 for the LIDAR device 22 to scan and "see" the receivers, namely the aircraft 30.

As can be seen in FIGS. 7 and 8, one or more reflectors 28, which in this embodiment, are retro-reflectors, are attached to a portion of the drogue 140 and the probe 142. For example, in this embodiment, the one or more reflectors 28 are attached to a base of the drogue 140 and a lower portion of the probe 142. It should be noted that although three reflectors 28 (which may be arrays of reflectors 28) are shown mounted to the drogue 140 in an equally spaced apart arrangement (120 degrees apart), different numbers of reflectors 28 having different relative spacing may be provided. In the illustrated embodiment, the spacing of the reflectors 28 provides for at least two of the reflectors 28 to be visible to the LIDAR device 22 at all times. It should be noted that any coupling means may be used, for example, to mount the reflectors 28 to the drogue 140, the probe 142 or other portions (e.g., the tail of the aircraft 30). Additionally, as described in more detail herein, the reflectors 28 are attached in an arrangement or array to facilitate detection and provide the required RNP.

In one embodiment, the reflectors 28, provided as retro-reflectors, return position signals or data to increase the receiver detection range. In various embodiments, similar to the boom/receptacle AR application, the LIDAR device 22 is configured to only search for, and return reflector x,y,z position and does not generate an image. However, in other embodiments, an image may be generated, for example, to provide additional information, such as to identify the type of aircraft 30 to be refueled. Additionally, different arrangements of reflectors 28 may be provided as described in connection with the boom/receptacle AR application, such as shown in FIGS. 5 and 6. For example, FIG. 5 illustrates a one dimensional (1D) array 40 of retro-reflectors 42 and FIG. 6 illustrates a two-dimensional (2D) array 50 of retro-reflectors 52. In operation, the retro-reflectors 42 and 52 provide an increased signal/noise and allow for encoding data. In particular, with respect to increased signal/noise, the retro-reflectors 42 and 52 allow for the receiver to be detected at a greater distance. Additionally, with respect to encoding information, the retro-reflectors 42 and 52 may be arranged or aligned to provide coded data to allow for positive identification of each of the of retro-reflectors 42 and 52 and allow the LIDAR device 22 (shown in FIG. 1) to calculate the distance between the drogue 140 and its encoded retro-reflectors for integrity monitoring.

In an exemplary embodiment, the LIDAR device 22 is configured (e.g., pre-programmed) with information regarding the geometry of the drogue 140 and the identification of the reflectors 28, such as the retro-reflectors 42 or 52 attached to the drogue 140 (such as based on the encoded information from the pattern of the retro-reflectors 42 or 52). In one embodiment, by comparing the measured position (x,y,z) of the retro-reflectors 42 or 52 of the drogue 140 and of the probe 142 and calculating the distance between the retro-reflectors 42 or 52, the LIDAR device 22 can generate integrity and accuracy estimates in real-time and provide the information to the AAR system of the tanker 24 and/or the aircraft 30. This information may then be provided to the crew of the tanker 24 or the air vehicle operator (AVO). Thus, in various embodiments, the retro-reflectors 42 or 52 on the drogue 140 provide high-confidence integrity monitoring. For example, known or expected patterns of retro-reflectors 42 and 52 may be located to positively identify, for example, the drogue 140 and the probe 142. It should be noted that in some embodiments, the retro-reflectors 42 or 52 attached to the drogue 140 are unique (e.g., use different coded data).

In various embodiments, a tanker/receiver Low Probability of Intercept/Low Probability of Detection LPI/LPD datalink is used to communicate a breakaway command from the tanker 24 to the receiver, the receiver to the tanker 24, or the AVO to the tanker 24, plus facilitate communication between the tanker crew and the AVO. The receiver can rendezvous with the tanker 24 by using this datalink by using: a) datalink direction finding; b) datalink radio ranging, and c) tanker state data (i.e., tanker altitude, heading, Euler angles, and airspeed), for example, at 1 Hz.

The LIDAR FOV 26 also can be adjusted to encompass a wider area during the rendezvous. For example, once the receiver has been located, the LIDAR FOV 26 can be restricted to the area where the receiver and drogue retro-reflectors are located to increase the scan rate. In other words, after the retro-reflectors 42 or 52 have been located and the receiver's ID has been confirmed, the LIDAR device 22 can tighten the search to locate the receiver on each successive scan by utilizing the receiver's last known position (and the drogue retro-reflectors for integrity monitoring) and ignore the rest of the y, z scan region. In an exemplary operation, during probe/drogue AR operation, the rendezvous is complete when the receiver has arrived at the awaiting AR position, which is confirmed by the LPS 20 as described herein. The tanker 24 then reels out the drogue 140 and initiates the transmission of drogue 140 and receiver x,y,z position data and tanker state data, for example, at 20 Hz via the tanker/receiver datalink. The receiver utilizes the LPS x,y,z data and tanker's Euler angles to safely maneuver and station keep behind the tanker 24.

The LIDAR device 22 can update the receiver's position, for example, at 20 Hz, while still scanning the full FOV, for example, at 1 Hz to look for other receivers that may have entered the tanker's airspace. If needed, the LIDAR device 22 can be used as a VOIP datalink from the awaiting AR position to contact with the additional laser transmitter on the tanker 24 and a laser receiver on the receiver.

In various embodiments, the receiver follows a predetermined pathway to align the probe 142 with the streamline that corresponds to the center of the probe 142. When the distance between the receiver and the drogue 140 stops decreasing, the LIDAR knows the drogue 140 has been plugged (engagement successful) and the receiver moves forward to a pre-determined x,y,z position and stabilizes to receive fuel. It should be noted that the LIDAR utilizes a pre-determined distance from the drogue 140 to the receiver as a continuity monitor to determine if the drogue 140 has fallen off the probe 142.

When re-fueling is complete, the receiver moves aft to astern and when cleared by the tanker 24, the receiver moves back to the awaiting AR position, and then departs the tanker 24. Thus, the LPS 20 enables probe/drogue AR without the use of a camera. Variations and modifications to the various embodiments are contemplated.

Figure 9:
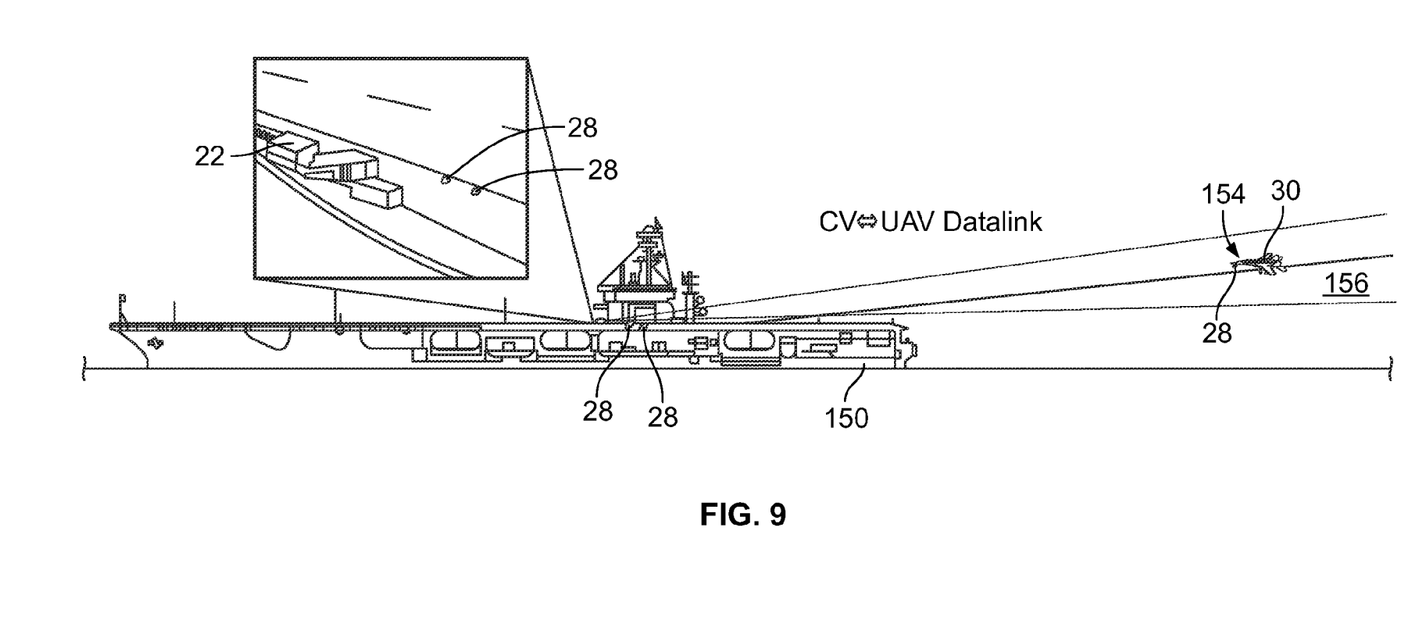
FIGS. 9-11 are illustrations of a laser positioning system for aircraft landing in accordance with various embodiments.
Figure 10:
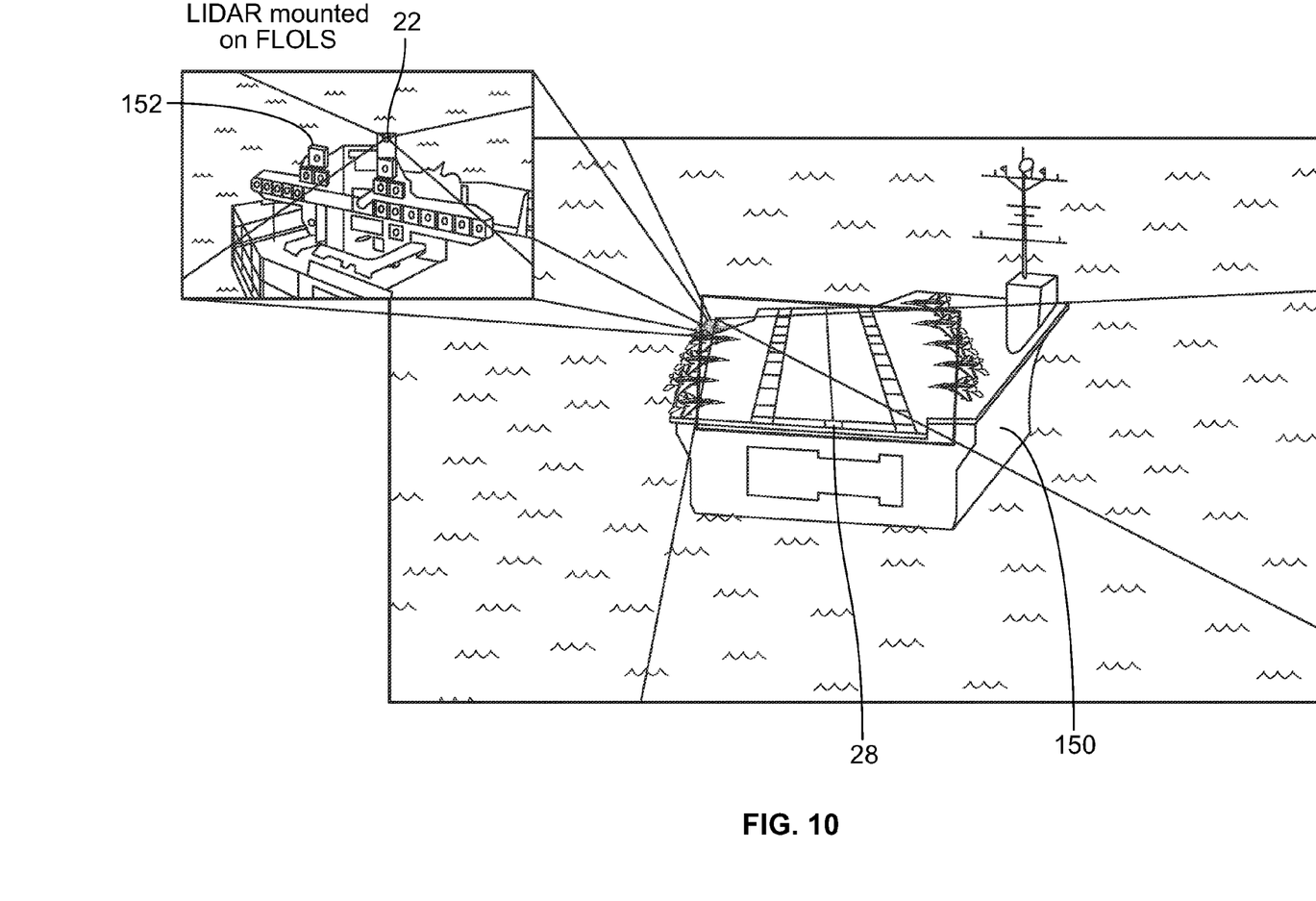
Figure 11:
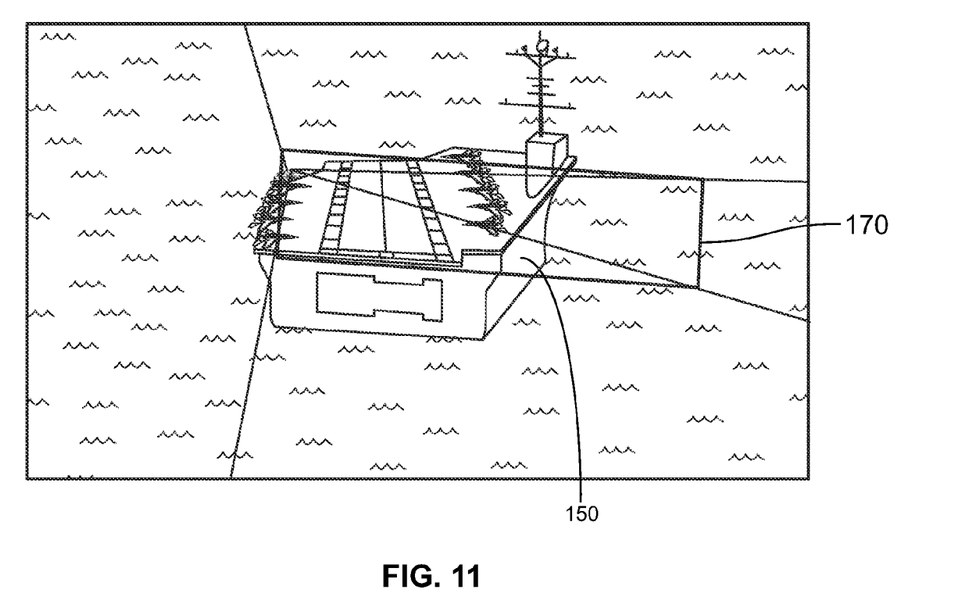

FIGS. 9-11 illustrate the LPS 20 used for landing the aircraft 30 on a deck of a ship 150, such as an aircraft carrier. However, positioning information obtained using the LPS 20 may be used for different landing applications, including, for example, non-sea applications. The LPS 20 includes a position determining device, illustrated as the LIDAR device 22, attached to the ship 150, which represents a hub 150. The hub 150 defines a target or destination for an approaching object 30, which is represented by the aircraft 30. The LIDAR device 22 may be attached to different portions of the ship 150. In one or more embodiments, the LIDAR device 22 may be mounted on a Fresnel Lens Optical Landing System (FLOLS) 152 and oriented to view aft of the ship 150.

The LIDAR device 22 may be orientated to scan a defined field of view 156, which in various embodiments is located aft of the ship 150. The field of view 156 may be a predetermined angular scanning range and distance range, for example, from the aft of the ship 150. The parameters for the field of view 156 may be defined to allow for detection of one or more different types of aircraft. For example, in the illustrated embodiment, the field of view 156 is defined to scan for one or more reflectors 28 attached to the aircraft 30 and/or located on the ship 150. In the illustrated embodiment, the reflectors 28, configured as retro-reflectors, are mounted on the UAV nose gear 154 and the deck edge of the ship 150. The hub 150 defines a target or destination for the object 30 as the object 30 is approaching and attempting to rendezvous with the hub 150. In an exemplary embodiment, the hub 150 is moving itself and the object 30 is attempting to rendezvous with such moving hub 150.

In one embodiment, the aircraft 30 is a UAV having one or more reflectors 28 attached to the landing gear or underside of the aircraft 30. It should be noted that in the various embodiments, the reflectors 28 may be provided at other locations of the aircraft 30. The one or more reflectors 28 may be any type of reflector, such as a retro-reflector that encodes information for use in position determination of the aircraft 30 relative to the ship 150 that may be used in the landing operation. The arrangement and/or configuration of the one or more reflectors 28 may be varied as desired or needed to provide encoded information (e.g., a pattern or array of reflectors 28 that are optionally located on a raised surface). In some embodiments, location information (or other information as described herein) may be encoded and determined using reflection only information from the one or more reflectors 28, elevation only information from the one or more reflectors 28, or reflection and elevation information from the one or more reflectors 28. In various embodiments, for example, the one or more reflectors 28 are retro-reflectors tuned to the wavelength of the laser of the LIDAR device 22.

Thus, by scanning with the LIDAR device 22, encoded information from the one or more reflectors 28 may be determined and used to facilitate alignment of a portion of the aircraft 30 with a portion of the ship 150 during the landing operations. For example, in some embodiments, the LIDAR device 22 is configured to perform scanning in an azimuth and elevation direction to identify any reflectors 28 within the field of view 156. For example, in some embodiments, the LIDAR device 22 performs three-dimensional (3D) LIDAR scanning to identify a portion of the aircraft 30 (e.g., landing gear, tail hook, and the like) and/or to identify a portion of the ship 150 (e.g., arresting gear, centerline for landing, and the like).

The LPS 20 may be used in connection with other position or location position systems, such as a ship-relative GPS integrity monitor. The LPS 20 may be used as a back-up landing guidance system or as a primary landing guidance system. Using one or more embodiments, a datalink may be established between the ship 150 (carrier vessel (CV)) and the aircraft 30, and positioning information from both systems may be used together to aid the landing operation. Optionally, the LIDAR device 22 may be an obscurant-penetrating LIDAR to "see through" obscurants (e.g., dust, fog, snow, rain) by using special pulse shapes and return processing.

In operation, the LPS 20 continuously scans searching for reflectors 28, such as the UAV nose gear retro-reflectors. In some embodiments, the LPS 20 detects UAV aircraft two miles or more from the ship 150, depending on meteorological conditions. For each scan, the LIDAR device 22 detects deck retro-reflectors on the deck of the ship 150 and confirms LPS integrity. When a UAV is detected, the retro-reflector of the UAV is scanned for tail number, and glideslope x/y/z position is determined. The tail number and x/y/z position are sent to each UAV via the CV/UAV datalink, for example, at 20 Hz, while the UAV stays in the field of view 156 of the LPS 20 and executes a landing on the ship. UAV VMS can also use the LPS x/y/z as a ship-relative, GPS integrity monitor. It should be noted that Sun interference can be mitigated with a notch filter centered at the laser's frequency.

In some embodiments, simple difference, ship-relative GPS (about 2 m (95%), based on common satellites) is used for maneuvering around the ship 150. In particular, for CV approach/glideslope control the following may be performed:

1. Utilize simple difference, ship-relative GPS until the LPS 20 becomes active (which does not require an LPI/LPD high-speed datalink);
2. Complete CV approach utilizing the LPS 20 with simple difference, ship-relative GPS as a backup;
3. When the UAV leaves the field of view 156 of the LPS 20, use the last valid x/y/z position and CV Euler angles to determine the bolter trajectory to clear the deck;
4. If the UAV captures a wire, CV landing is complete; or
5. If the UAV does not capture a wire: fly bolter trajectory using Inertial Measurement Unit IMU and CV Euler angles and once clear of the CV, switch back to simple difference, ship-relative GPS, for maneuvering around the CV.

It should be noted, for example as shown in FIG. 11, that the LIDAR scan (represented by the area 170) may be increased to include a capture wire at centerline and reflectors 28 may be associated with the capture wire and/or the centerline.

Figure 12:
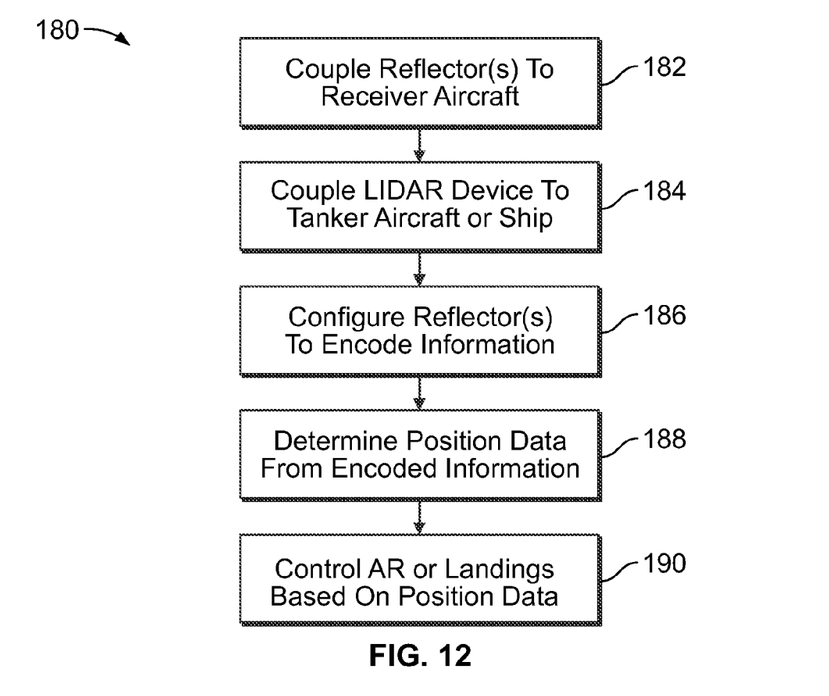
FIG. 12 is an illustration of a method in accordance with an embodiment.

Thus, the LPS 20 may be used in different applications, such as boom/receptacle AR, probe/drogue AR or ship landing. Various embodiments provide a method 180 as shown in FIG. 12 for laser positioning. In various embodiments, the method 180, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

In particular, the method 180 includes coupling one or more reflectors, such as retro-reflectors as described herein, to a receiver aircraft at 182. For example, the reflectors may be attached to refueling components of the receiver aircraft. As described herein, the reflectors may be arranged in a pattern and also include elevation characteristics.

The method 180 includes coupling a LIDAR device to a tanker aircraft or ship at 184. For example, a LIDAR device may be attached to a refueling component of the tanker aircraft or a landing portion of the ship. It should be noted that one or more reflectors also may be attached to the tanker aircraft (such as to a refueling portion thereof) or to the ship.

The method 180 includes configuring the reflectors to encode information at 186. For example, as described herein the arrangement or configuration of the reflectors (e.g., pattern or relative spacing) may be used to encode information acquired by a LIDAR scan. The method 180 further includes determining position data at 188 from the encoded information. For example, as described herein, position data, such as the relative position of the receiver aircraft to the tanker aircraft (or refueling portions thereof) or the ship may be determined.

The method 180 also includes controlling AR operation or landing at 190 based on the position data. For example, the refueling position of the receiver aircraft or landing position of the receiver aircraft may be controlled from a remote location based on the position data.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It should be noted that the particular arrangement of components (e.g., the number, types, placement, or the like) of the illustrated embodiments may be modified in various alternate embodiments. In various embodiments, different numbers of a given module, system, or unit may be employed, a different type or types of a given module, system, or unit may be employed, a number of modules, systems, or units (or aspects thereof) may be combined, a given module, system, or unit may be divided into plural modules (or sub-modules), systems (or sub-systems) or units (or sub-units), a given module, system, or unit may be added, or a given module, system or unit may be omitted.

It should be noted that the various embodiments may be implemented in hardware, software or a combination thereof. The various embodiments and/or components, for example, the modules, systems, or components and controllers therein, also may be implemented as part of one or more computers or processors. The computer or processor may include a computing device, an input device, a display unit, and an interface. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," "system", and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module", "system", or "computer."

The computer, module, system, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, system, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs, systems, or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A laser positioning system comprising:
   a Light Detection and Ranging (LIDAR) device mounted to a hub; and
   one or more reflectors attached to a portion of an aircraft, the one or more reflectors being encoded with aircraft identifying information scanable by the LIDAR device, wherein the LIDAR device is configured to scan a field of view to identify the one or more reflectors and determine position data based on the identified one or more reflectors in the field of view, the LIDAR device retrieving the encoded aircraft identifying information and providing integrity monitoring by analyzing the encoded aircraft identifying information.

2. The laser positioning system of claim 1, wherein the one or more reflectors comprise one or more retro-reflectors.

3. The laser positioning system of claim 1, wherein the one or more reflectors are arranged in a pattern.

4. The laser positioning system of claim 3, wherein the pattern is a one-dimensional array.

5. The laser positioning system of claim 3, wherein the pattern is a two-dimensional array.

6. The laser positioning system of claim 1, wherein the one or more reflectors are raised with respect to a surface on which the one or more reflectors are mounted.

7. The laser positioning system of claim 1, wherein the aircraft is an unmanned aerial vehicle.

8. The laser positioning system of claim 1, wherein the hub defines a target for the aircraft and the aircraft is moved toward the hub to rendezvous with the hub, the LIDAR device determining a relative position of the aircraft with respect to the hub.

9. The laser positioning system of claim 1, wherein the one or more reflectors includes at least two reflectors on the aircraft differenced to provide encoded data to the LIDAR device based on distance between at least two reflectors on the aircraft.

10. The laser positioning system of claim 1, wherein the LIDAR device has an adjustable field of view adjusted based on proximity of the one or more reflectors to the LIDAR device.

11. The laser positioning system of claim 1, wherein the hub is one of a tanker aircraft or a ship.

12. The laser positioning system of claim 1, wherein at least one of the reflectors is attached to a portion of the hub and at least one of the reflectors is attached to the aircraft, the LIDAR device determining a relative distance between at least one reflector on the hub and at least one reflector on the aircraft.

13. The laser positioning system of claim 1, wherein the hub is a tanker aircraft and the aircraft rendezvous with the tanker aircraft during an aerial refueling operation, the LIDAR device determining a relative position of the aircraft with respect to the tanker aircraft during the aerial refueling operation.

14. The laser positioning system of claim 1, wherein the hub is a tanker aircraft and the one or more reflectors are attached to a boom of the tanker aircraft and a receptacle of the aircraft.

15. The laser positioning system of claim 1, wherein the hub is a tanker aircraft and the one or more reflectors are attached to a drogue of the tanker aircraft and a probe of the aircraft.

16. The laser positioning system of claim 1, wherein the hub is a tanker aircraft further comprising a tanker-receiver datalink, wherein the tanker-receiver datalink facilitates at least one of direction finding, radio ranging, or transmitting tanker state data at approximately 1 Hz.

17. The laser positioning system of claim 1, wherein the hub is a ship and the aircraft rendezvous with the ship during a landing operation, the LIDAR device determining a relative position of the aircraft with respect to a landing deck of the ship during the landing operation.

18. The laser positioning system of claim 1, wherein the hub is a ship and the LIDAR device is mounted to a Fresnel Lens Optical Landing System (FLOLS) of the ship, one or more of the reflectors are attached to a nose gear of the aircraft and a portion of the ship.

19. The laser positioning system of claim 1, wherein the one or more reflectors are configured to encode tail number information for the aircraft.

20. The laser positioning system of claim 1, further comprising a plurality of reflectors arranged in an evenly spaced pattern on a surface of the aircraft.

21. The laser positioning system of claim 1, wherein the encoded aircraft identifying information is patterned to define coded data bits.

22. The laser positioning system of claim 1, wherein the encoded aircraft identifying information is patterned to be binary bit coded.

23. The laser positioning system of claim 1, wherein the encoded aircraft identifying information is coded by at least one of shape, spacing and patterning of the reflectors to create a unique code for the aircraft for integrity monitoring, wherein different aircraft have different unique codes.

24. A laser positioning system comprising:
a Light Detection and Ranging (LIDAR) device with an adjustable field of view, the LIDAR device mounted to a hub and used to determine position information about an aircraft approaching the hub;
a receiver reflector detected by the LIDAR device; and
a delivery reflector detected by the LIDAR device, wherein at least one of the receiver reflector and the delivery reflector are encoded with aircraft identifying information scanable by the LIDAR device, the LIDAR device retrieving the encoded aircraft identifying information and providing integrity monitoring by analyzing the encoded aircraft identifying information, wherein the receiver and delivery reflectors are differenced to provide relative position data.

25. The laser positioning system of claim 24, wherein the receiver reflector is provided on the aircraft and the delivery reflector is provided on the hub.

26. The laser positioning system of claim 25, wherein the hub is a tanker aircraft and the delivery reflector is attached to a boom of the tanker aircraft and the receiver reflector is attached to a receptacle of the aircraft that receives the boom for aerial refueling.

27. The laser positioning system of claim 25, wherein the hub is a tanker aircraft and the delivery reflector is attached to a drogue of the tanker aircraft and the receiver reflector is attached to a probe of the aircraft that couples with the drogue for aerial refueling.

28. The laser positioning system of claim 24, further comprising a tanker-receiver datalink, wherein the tanker-receiver datalink facilitates at least one of direction finding, radio ranging, or transmitting tanker state data at approximately 1 Hz.

29. A method for laser positioning, the method comprising:
scanning a field of view aft of a hub using a Light Detection and Ranging (LIDAR) device mounted on the hub; and
determining position data for an aircraft within the field of view based on scanned positions of one or more reflectors attached to the aircraft having encoded aircraft identifying information defined by the one or more reflectors; and
determining the encoded aircraft identifying information from the scanned one or more reflectors for integrity monitoring by analyzing the encoded aircraft identifying information.

30. The method of claim 29, further comprising controlling refueling operation of the aircraft with the hub using the position data.

31. The method of claim 29, further comprising controlling a landing operation of the aircraft with the hub using the position data.

32. The method of claim 29, wherein said determining position data comprises determining a relative position of the aircraft to the hub based on relative positions of one or more reflectors attached to the hub and the one or more reflectors attached to the aircraft.

33. The method of claim 32, further comprising providing one or more reflectors on a boom of the hub and providing one or more reflectors on a receptacle of the aircraft that receives the boom during an aerial refueling operation.

34. The method of claim 32, further comprising providing one or more reflectors on a drogue of the hub and providing one or more reflectors on a probe of the aircraft that receives the drogue during an aerial refueling operation.

35. The method of claim 32, further comprising providing one or more reflectors on a landing deck of the hub and providing one or more reflectors on landing gear of the aircraft used for landing on the landing deck of the hub during a landing operation.

36. The method of claim 29, further comprising determining aircraft identification data from the encoded information.

37. The method of claim 29, further comprising changing a size of the field of view based on a previous scan using the LIDAR device.

* * * * *